March 5, 1968   C. W. MILLER   3,371,576
ENLARGER EASEL
Filed July 14, 1965
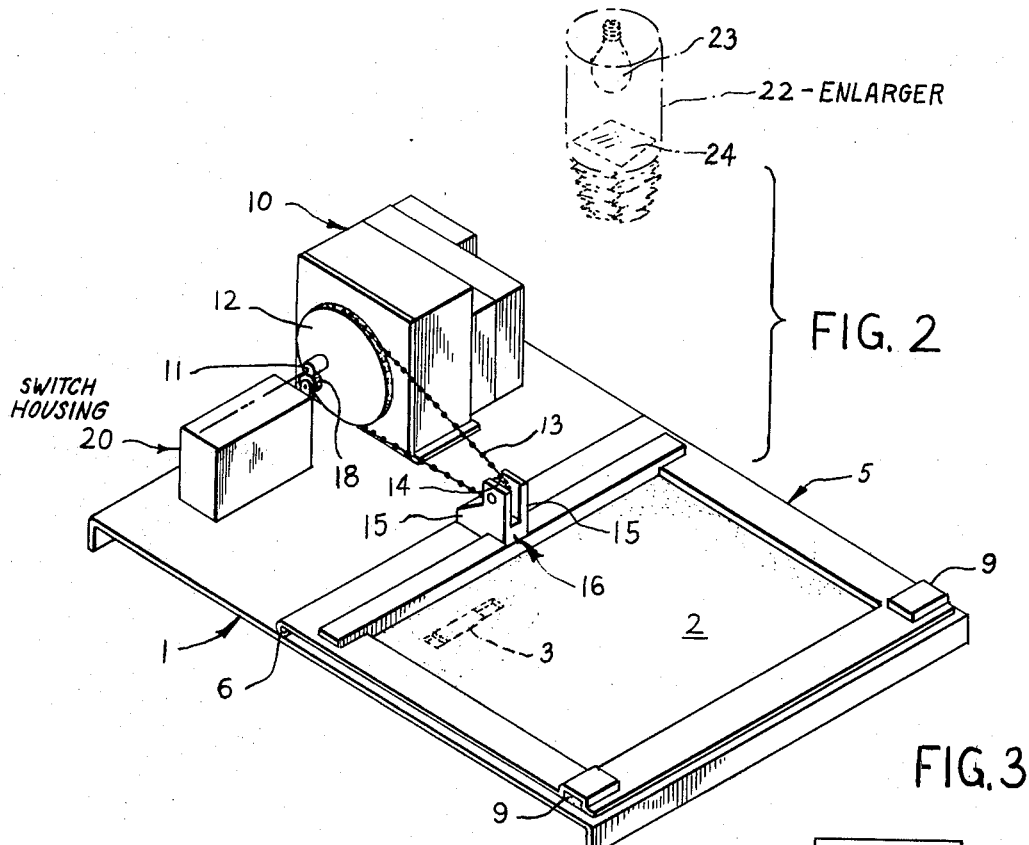
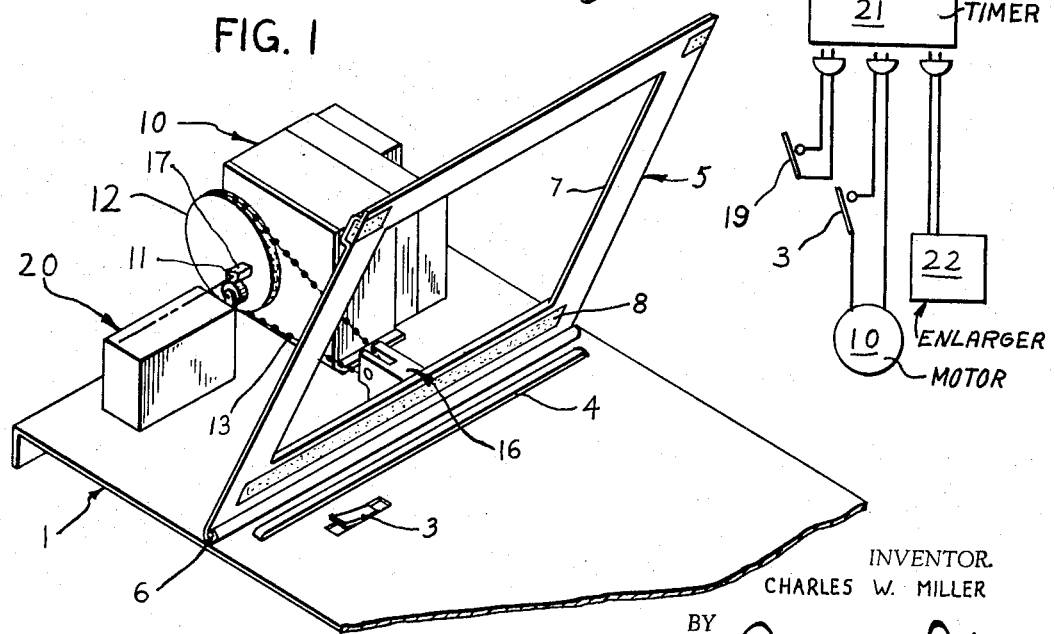
INVENTOR.
CHARLES W. MILLER
BY Arthur H. Robert
HIS ATTORNEY

United States Patent Office 3,371,576
Patented Mar. 5, 1968

3,371,576
ENLARGER EASEL
Charles W. Miller, Cedar Lane Trailer Court,
Radcliff, Ky. 40160
Filed July 14, 1965, Ser. No. 471,976
6 Claims. (Cl. 88—24)

This invention relates to an enlarger easel and, more particularly, to an enlarger easel of the type wherein a framing platen is moved from an inoperative position to its framing position and back to its inoperative position and an illuminating source within the enlarger is actuated when the platen is in its framing position.

It is customary to produce an enlarged picture by directing light from an enlarger through a film negative onto a sheet of sensitized photographic printing paper, which is positioned in operative alignment on an easel. The easel has a guide on one side, against which one edge of the sensitized sheet is disposed, and a framing platen which can be moved over the easel to "frame" the sensitized sheet.

After the sheet of paper is operatively positioned or "framed," an incandescent light within the enlarger is actuated (usually by a timer) to direct an expanding beam of light through the film negative and across the space between it and the sensitized sheet. If a cold light such as a fluorescent or mercury vapor light is employed rather than an incandescent light, then a shutter is actuated, either by a timer or manually, to allow the light to be sent through the film negative.

After the sheet of sensitized photographic printing paper has been illuminated with the image of the film negative, the framing platen is first removed and the sheet of paper is then removed from the easel and developed.

The operation of the foregoing enlarging apparatus to produce an enlarged picture requires a substantial period of time. If a large number of enlarged prints is to be produced from a single film negative, this manual method is particularly undesirable because of the long period of time required. It also increases the cost of producing substantial quantities of enlarged pictures from a single film negative due to the labor cost involved.

The present invention satisfactorily solves the foregoing problems by providing a mechanism in which it is only necessary for the operator to position the sheet of sensitized photographic printing paper on a support platform or base and then remove the sheet after it has been illuminated with light sent through the film negative in the enlarger. The positioning of the framing platen and the actuation of the source of light or the shutter is automatically performed in a timed sequence by the present invention. Thus, a substantial saving in time and labor costs is produced by the present invention.

An object of this invention is to provide a device for automatically moving a framing platen to its framing position when a sheet of sensitized photographic printing paper is placed in position for illumination by light in an enlarger passing through a film negative in the enlarger.

Another object of this invention is to provide a device for automatically directing the light of the enlarger through the film negative only after the framing platen is in its framing position.

Other objects of this invention will be readily perceived from the following description, claims, and drawing.

The attached drawing illustrates a preferred embodiment of the invention, in which:

FIGURE 1 is a perspective view of an easel mechanism of the present invention with the framing platen in its inoperative or raised position;

FIGURE 2 is a perspective view of the structure of FIGURE 1 with the framing platen in its framing or operative position and an enlarger shown in phantom; and FIGURE 3 is a diagrammatic view of part of the electrical circuitry of the present invention.

Referring to the drawing and particularly to FIGURES 1 and 2, there is shown a support platform or base 1 on which a sheet 2 of sensitized photographic printing paper may be placed. The top surface of the platform or base 1 has a normally open microswitch 3 disposed therein. When the sheet 2 of paper is disposed on the top surface of the platform or base 1, the microswitch 3 is closed.

A centering strip 4 is disposed on the top surface of the platform or base 1. The centering strip 4 has a longitudinal slot to receive one edge of the sheet 2 to insure that the sheet 2 is properly positioned on the platform or base 1.

A rectangular shaped framing platen 5 is pivotally mounted on the base or platform 1 by a hinge 6. The framing platen 5 has a rectangular shaped opening 7 to define the size of the picture that is produced on the sheet 2.

The framing platen 5 has a recess 8 adjacent one side of the rectangular shaped opening 7 to receive the centering strip 4 when the platen 5 engages the base 1. The framing platen 5 has a block 9 at each of the corners, which are remote from the hinge 6.

The framing platen 5 is moved from the inoperative or raised position of FIGURE 1 to the framing or operative position of FIGURE 2 and vice versa by a drive means, which is preferably an electric motor 10. The motor 10, which is preferably mounted on the top surface of the support platform or base 1 adjacent one end thereof, has a shaft 11, which projects therefrom and which rotates about a fixed axis.

A sprocket 12 is eccentrically mounted on the shaft 11 for eccentric rotation by the electric motor 10 about the fixed axis of its shaft 11. The eccentrically mounted sprocket 12 is connected by a chain 13 to a sprocket 14 on the framing platen 5. The sprocket 14 is mounted between upstanding walls 15 of a lug 16, which is fixed to one side of the framing platen 5 adjacent the hinge 6.

With the foregoing arrangement, the platen 5 moves from its raised sheet-transfer position of FIGURE 1 to its lowered operative sheet-framing position of FIGURE 2 and then returns to the raised position of FIGURE 1 during one revolution of the shaft 11 of the motor 10, which always rotates the shaft 11 in the same direction. The eccentric mounting of the sprocket 12 effects the movement of the platen.

Accordingly, while the drive means of the present invention may be, it does not have to be in the form of a reversible motor in order for the platen 5 to be moved downwardly into engagement with the platform or base 1 and upwardly away from the platform or base 1.

The shaft 11, which extends through the sprocket 12, has a flat surface 17 for cooperation with a roller arm 18 of a microswitch 19. The arm 18 is disposed in spaced relation to the top surface of the support platform or base 1 by a switch housing 20.

The shaft 11 is positioned with respect to the sprocket 12 so that its flat surface 17 engages the roller arm 18 of the microswitch 19 when the platen 5 is in its framing or operative position in which it engages the platform or base 1 to frame the sheet 2 within the rectangular shaped opening 7. When the microswitch 19 is closed, a timer 21 (see FIGURE 3), which is disposed within the switch housing 20, is energized. When energized, the timer 21 controls the passing of light from an incandescent lamp 23 through a film negative 24 in an enlarger 22, which is supported from suitable structure such as the room ceiling, for example, and determines the amount of time that the light passes through the film negative.

Of course, if a cold light such as fluorescent or mercury vapor is utilized in the enlarger 22 rather than the incandescent lamp 23, a shutter within the enlarger 22 is controlled by the timer 21 rather than the lamp 23. In either manner, the light is controlled through the timer 21 since the timer 21 determines when the light passes through the film negative.

The timer 21 automatically shuts off the incandescent lamp 23 or closes the shutter in the enlarger 22 after a predetermined period of time. Thus, the timer 21 opens the circuit, which energizes either the lamp or the shutter in the enlarger 22, irrespective of whether the microswitch 19 is still held closed by the flat surface 17 of the shaft 11.

As shown in FIGURE 3, the normally open microswitch 3 controls the operation of the electric motor 10 so that the motor 10 runs whenever the switch 3 is closed. It should be observed that the motor 10 is connected to power through the timer 21.

In operation, the enlarger 22 is provided with the film negative 24 and is positioned in operative alignment with the framed area of the easel. With the platen 5 in its raised or inoperative position, one of the sheets 2 of the sensitized photographic printing paper is positioned on the platform or base 1. One edge of the sheet 2 is disposed within the longitudinal slot of the centering strip 4 to properly position the sheet 2 on the top surface of the base 1. When the sheet 2 rests on the top surface of the platform or base 1, it closes the normally open microswitch 3.

The closing of the microswitch 3 energizes the electric motor 10 to rotate the shaft 11 clockwise (as viewed in FIGURES 1 and 2). This results in clockwise rotation of the eccentrically mounted sprocket 12 to pivot the framing platen 5 about the hinge 6. When the framing platen 5 closely approaches its operative print framing position of FIGURE 2, the flat surface 17 of the shaft 11 will engage the roller arm 18 of the normally open microswitch 19 sufficiently to close the switch 19. This results in energizing the timer 21, which during the time required for the platen to reach its operative position, operates to energize the enlarger lamp 23 and which, after a predetermined time, deenergizes it until the next enlarging operation. Naturally the time (when the enlarger is initially energized) and the time period (during which it remains energized) may be varied.

So long as the photo-sensitive sheet 2 maintains the normally-open microswitch 3 closed, the motor 10 will rotate; hence, it allows the framing platen 5 to remain in its horizontal operative framing position only for a short interval of time after which it pivots the platen 5 counter-clockwise about the hinge 6 so as to raise it toward its uppermost FIG. 1 position. In this connection, it may be noted that the eccentricity of the sprocket 12 first causes the framing 5 to be lowered rapidly, next causes the speed of that framing platen 5 to be reduced during the middle stages (i.e. the final stages of its downward movement and the initial stages of its return upward movement) and finally causes the framing 5 to be raised rapidly. The rapid lowering and raising movements of the framing plate 5 speeds up production while its slow middle-stage movements provide ample time for the operation of the enlarger 22.

The timer 21 allows the light to pass through the film negative within the enlarger 22 for only a very short period of time whereupon it automatically opens the lamp circuit. Because of the short length of time for this operation, the framing platen 5 is in its framing position throughout this period of time despite the continuous rotation of the motor.

As the motor 10 continues to rotate, the shaft 11 has its flat surface 17 moved away from engagement with the roller arm 18 of the microswitch 19 whereby the microswitch 19 returns to its normally open position, the circuit, which controls the light source or shutter within the enlarger 22, reverts to the condition in which it may be again energized when the microswitch 19 is closed.

The continuous clockwise rotation of the shaft 11 results in the platen 5 moving away from the position of FIGURE 2 toward the position of FIGURE 1 because of the eccentric mounting of the sprocket 12. As soon as the framing platen 5 is moved sufficiently to permit the sheet 2 to be withdrawn from the base 1, the operator may remove the sheet 2 from the base 1. When the operator removes the sheet 2 from the platform or base 1, the microswitch 3 returns to its normally open position whereby the motor 10 is de-energized.

The framing platen 5 may not be at its uppermost position when the sheet 2 is withdrawn. However, when another of the sheets 2 is disposed within the longitudinal slot of the centering strip 4 and the normally open microswitch 3 is closed, the continuous clockwise rotation of the shaft 11 results in the platen 5 going to its uppermost position and then starting downward again until it reaches the position of FIGURE 2. If the sheet 2 should not have been withdrawn until after the framing platen 5 has reached its uppermost position, the positioning of another of the sheets 2 on the platform or base 1 closes the switch 3 to result in the framing platen 5 moving downwardly to its framing position.

Accordingly, it is not necessary for the operator to remove the sheet 2 at any specific time. It is only necessary that the operator remove the sheet 2 while the framing platen 5 is raised from the platform or base 1. Because of the eccentric mounting of the sprocket 12 on the shaft 11, a continuous cycle of movement of the framing platen 5 occurs from its uppermost or inoperative position to its framing or operative position and vice versa.

While the framing platen 5 has been shown as being pivotally mounted through the hinge 6, any other suitable type of mounting arrangement whereby the framing platen 5 could move from an inoperative or raised position to an operative or framing position and vice versa would be satisfactory. While the eccentric connection between the shaft 11 of the electrical motor 10 and the framing platen 5 has been shown to be a sprocket and chain arrangement, any other suitable connection between the shaft 11 of the electrical motor 10 and the framing platen 5 wherein the output of the shaft 11 is transformed into an eccentric movement would suffice. For example, a linkage arrangement could be employed.

An advantage of this invention is that the operator only has to place and remove the sensitized photographic printing sheet of paper from the support platform or base while all of the other operations are automatically carried out. Another advantage of this invention is that the time to produce a large quantity of enlarged pictures is substantially reduced.

In brief I have provided an apparatus for photographically enlarging images, comprising: (A) a base member 1 providing a receiving surface on which a sensitized sheet 2 is to be operatively centered; (B) a framing platen 5 mounted for movement, relative to said surface, into and out of an operative position in which it frames a centered sheet 2 on said sheet-receiving surface; (C) platen-moving means 10–16 operative, in response to the placement of a sheet on said surface, to move said platen 5 into and out of said operative sheet-framing position, the platen-moving means including (1) motorized means 10–16 operative, when activated, to move said platen 5 into and out of said operative sheet-framing position, (a) the motorized means including speed varying means (such as eccentric 12) for moving said platen 5 rapidly toward said operative position, thence slowly into and out of said position and thence rapidly away from said position, and (2) activating means mounted in position to be actuated by (or through the instrumentality of) a sensitized sheet 2 as that sheet is placed on said surface and operative, when actuated, to activate said platen-moving motorized means, the activating means including switch 3 arranged along said surface in position to be engaged and actuated by said sheet as that sheet is placed on said surface; (D) enlarger means 22 operative, when energized, to illuminate a sensitized sheet on said surface with an enlargement of said image; (E) a timer 21; and (F) means 18–19 operative, in response to the operation of said platen-moving means, to energize said enlarger means.

Having described my invention, I claim:

1. An enlarger easel for receiving and "framing" a sheet of sensitized photographic paper while an enlarged image is formed theron, comprising:
   (A) a base member providing a receiving surface on which a sensitized sheet is to be operatively centered;
   (B) a framing platen mounted for movement relative to said surface into and out of an operative position in which it frames a centered sheet on said sheet-receiving surface; and
   (C) platen-moving means operative, in response to the placement of a sheet on said surface, to move said platen into and out of said operative sheet-framing position.

2. The easel of claim 1 wherein said response means comprises:
   (A) motorized means operative, when activated, to move said platen into and out of said operative sheet-framing position; and
   (B) activating means operative, when actuated, to activate said platen moving motorized means,
      (1) said activating means being mounted in position to be actuated through the instrumentality of a sensitized sheet as that sheet is placed on said surface.

3. The easel of claim 2 wherein:
   (A) said motorized means includes speed varying means for moving said platen rapidly toward said operative position, thence slowing into and out of said position and thence rapidly away from said position.

4. The easel of claim 3 wherein:
   (A) said speed varying means includes an eccentric.

5. The easel of claim 2 wherein:
   (A) said activating means includes a switch arranged along said surface in position to be engaged and actuated by said sheet as that sheet is placed on said surface.

6. An apparatus for photographically enlarging images comprising:
   (A) a base member providing a receiving surface on which a sensitized sheet is to be operatively centered;
   (B) a framing platen mounted for movement, relative to said surface, into and out of an operative position in which it frames a centered sheet on said sheet-receiving surface;
   (C) platen-moving means operative, in response to the placement of a sheet on said surface, to move said platen into and out of said operative sheet-framing position;
   (D) enlarger means operative, when energized, to illuminate a sensitized sheet on said surface with an enlargement of said image;
   (E) a timer; and
   (F) means operative, in response to the operation of said platen-moving means, to energize said enlarger means for a time interval controlled by said timer.

References Cited

UNITED STATES PATENTS

| | | | |
|---|---|---|---|
| 1,696,381 | 12/1928 | Caps | 88—24 |
| 2,822,723 | 2/1958 | Grey | 88—24 |
| 2,848,923 | 8/1958 | Diefenbach | 88—24 |
| 2,864,291 | 12/1958 | Mergens | 88—24 X |
| 3,102,463 | 9/1963 | Biederman et al. | 95—73 |

NORTON ANSHER, *Primary Examiner.*

WAYNE A. SIVERTSON, *Assistant Examiner.*